(12) United States Patent
Chen et al.

(10) Patent No.: US 10,834,321 B2
(45) Date of Patent: Nov. 10, 2020

(54) FOCUSING METHOD, DEVICE AND STORAGE MEDIUM

(71) Applicant: BEIJING XIAOMI MOBILE SOFTWARE CO., LTD., Beijing (CN)

(72) Inventors: Xiaolong Chen, Beijing (CN); Hui Du, Beijing (CN); Yihan Wu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 16/357,345

(22) Filed: Mar. 19, 2019

(65) Prior Publication Data

US 2019/0297262 A1    Sep. 26, 2019

(30) Foreign Application Priority Data

Mar. 20, 2018  (CN) .......................... 2018 1 0232030

(51) Int. Cl.
*H04N 5/232* (2006.01)
*H04M 1/02* (2006.01)

(52) U.S. Cl.
CPC ...... *H04N 5/23267* (2013.01); *H04M 1/0262* (2013.01); *H04N 5/232* (2013.01); *H04N 5/23212* (2013.01); *H04N 5/23287* (2013.01)

(58) Field of Classification Search
CPC .............. H04N 5/23267; H04N 5/232; H04N 5/23287; H04N 5/23212; H04N 5/23264; H04N 5/23229; H04M 1/0262
See application file for complete search history.

(56) References Cited

U.S. PATENT DOCUMENTS

| 6,556,246 B1* | 4/2003 | Suda ................ H04N 5/23212 |
| | | 348/208.12 |
| 2007/0086770 A1* | 4/2007 | Okita .................. G02B 7/023 |
| | | 396/133 |
| 2011/0176014 A1 | 7/2011 | Hong |
| 2014/0307111 A1 | 10/2014 | Nishigori |

(Continued)

FOREIGN PATENT DOCUMENTS

| CN | 101246250 Y | 8/2008 |
| CN | 101600113 A | 12/2009 |

(Continued)

OTHER PUBLICATIONS

The first Office Action of Chinese Patent Application No. 201810232030. 3, from the CNIPA, dated Nov. 5, 2019.

(Continued)

*Primary Examiner* — Gevell V Selby
(74) *Attorney, Agent, or Firm* — Syncoda LLC; Feng Ma (57) ABSTRACT

A focusing method includes acquiring a current frame image through a camera; performing through an image stabilization algorithm a uttering compensation on the current frame image acquired by the camera to form a compensated image, wherein the image stabilization algorithm is used to perform electronic anti-jittering processing; performing through a statistic value algorithm a statistic value operation on the compensated image, to obtain statistic value information of the compensated image; determining focusing data to be used to move the camera to a focus position, according to the statistic value information; and adjusting a position of the camera according to the focusing data, to achieve focusing.

14 Claims, 4 Drawing Sheets

(56) References Cited

U.S. PATENT DOCUMENTS

| | | | |
|---|---|---|---|
| 2015/0009355 A1* | 1/2015 | Peng | H04N 5/23251 |
| | | | 348/222.1 |
| 2015/0022679 A1 | 1/2015 | Shchepetov | |
| 2017/0134659 A1* | 5/2017 | Miyahara | H04N 5/378 |
| 2018/0041709 A1 | 2/2018 | Konttori | |
| 2019/0156516 A1* | 5/2019 | Nikkanen | H04N 5/2353 |

FOREIGN PATENT DOCUMENTS

| | | |
|---|---|---|
| CN | 101783962 A | 7/2010 |
| CN | 103108121 A | 5/2013 |
| CN | 103685918 A | 3/2014 |
| CN | 205249350 A | 5/2016 |
| CN | 105721776 Y | 6/2016 |
| CN | 107257429 A | 10/2017 |
| CN | 107809590 A | 3/2018 |
| EP | 2680568 A | 1/2014 |

OTHER PUBLICATIONS

EESR of European Patent Application No. 19163991.3, from the European Patent office, dated Jun. 7, 2019.

\* cited by examiner

FOCUSING METHOD, DEVICE AND STORAGE MEDIUM

CROSS-REFERENCE TO RELATED APPLICATION

This application claims priority to Chinese patent application No. 201810232030.3, filed on Mar. 20, 2018, the disclosure of which is incorporated herein by reference in its entirety.

BACKGROUND

With the continuous development of terminal technologies, mobile terminals such as mobile phones and tablet computers have already possessed powerful processing capabilities and have deeply merged into people's work and lives. Currently, these mobile terminals can be used not only for communication and networking, but also for photographing or videotaping. In order to improve the quality of the image or video, focusing may also be performed during photographing or videotaping.

SUMMARY

The present disclosure relates to the technical field of image processing, and more particularly, to a focusing method, device and a storage medium.

In order to overcome the problem existing in the related art, the present disclosure provides a focusing method, device and a storage medium.

In an aspect, there is provided a focusing method. The method includes:

acquiring a current frame image through a camera;

performing through an image stabilization algorithm a jittering compensation on the current frame image acquired by the camera to form a compensated image, the image stabilization algorithm being used to perform electronic anti-jittering processing;

performing through a statistic value algorithm a statistic value operation on the compensated image, to obtain statistic value information of the compensated image;

determining focusing data to be used to move the camera to a focus position, according to the statistic value information; and adjusting a position of the camera according to the focusing data, to achieve focusing.

In some embodiments, said performing through an image stabilization algorithm a jittering compensation on the current frame image acquired by the camera includes:

determining an optimal motion vector for indicating a jittering direction of the camera and a jittering displacement amount of the camera in a three-dimensional space; and performing the jittering compensation on the current frame image acquired by the camera, according to the optimal motion vector.

In some embodiments, said determining an optimal motion vector includes:

obtaining output information of a gyroscope, the output information including a jittering direction of the camera and a displacement amount of the camera in a three-dimensional space;

determining a motion vector corresponding to the output information; and determining the optimal motion vector according to the motion vector corresponding to the output information.

In some embodiments, said determining the optimal motion vector according to the motion vector corresponding to the output information includes:

adjusting the current frame image acquired by the camera, according to the motion vector corresponding to the output information;

obtaining a plurality of first histogram statistic values and a plurality of second histogram statistic values, wherein the plurality of first histogram statistic values refer to histogram statistic values of a plurality of pixels of the adjusted frame image of the current frame image in a preset histogram statistic window, and the second histogram statistic values refer to histogram statistic values of a plurality of pixels of a previous frame image acquired by the camera in the preset histogram statistic window; and determining the optimal motion vector according to the plurality of first histogram statistic values and the plurality of second histogram statistic values.

In some embodiments, said determining the optimal motion vector according to the motion vector corresponding to the output information includes:

adjusting the current frame image acquired by the camera, according to the motion vector corresponding to the output information;

determining at least one feature point in the adjusted frame image of the current frame image and at least one feature point in a previous frame image acquired by the camera; and determining the optimal motion vector from the at least one feature point in the adjusted frame image of the current frame image and the at least one feature point in the previous frame image acquired by the camera.

In another aspect, there is provided a focusing device. The device includes:

an acquiring module, configured to acquire a current frame image through a camera;

a jittering compensation module, configured to perform through an image stabilization algorithm a jittering compensation on the current frame image acquired by the camera, the image stabilization algorithm being used to perform electronic anti-jittering processing;

a statistic value operation module, configured to perform through a statistic value algorithm a statistic value operation on the compensated image, to obtain statistic value information of the compensated image;

a determining module, configured to determine focusing data to be used to move the camera to a focus position, according to the statistic value information; and an adjusting module, configured to adjust a position of the camera according to the focusing data, to achieve focusing.

In some embodiments, the jittering compensation module includes:

a first determining sub-module, configured to determine an optimal motion vector for indicating a jittering direction of the camera and a jittering displacement amount of the camera in a three-dimensional space; and a jittering compensation sub-module, configured to perform the jittering compensation on the current frame image acquired by the camera, according to the optimal motion vector.

In some embodiments, the first determining sub-module includes:

an obtaining unit, configured to obtain output information of a gyroscope, the output information including a jittering direction of the camera and a displacement amount of the camera in a three-dimensional space;

a first determining unit, configured to determine a motion vector corresponding to the output information; and a second determining unit, configured to determine the optimal motion vector according to the motion vector corresponding to the output information.

In some embodiments, the second determining unit is mainly configured to:

adjust the current frame image acquired by the camera, according to the motion vector corresponding to the output information;

obtain a plurality of first histogram statistic values and a plurality of second histogram statistic values, wherein the plurality of first histogram statistic values refer to histogram statistic values of a plurality of pixels of the adjusted frame image of the current frame image in a preset histogram statistic window, and the second histogram statistic values refer to histogram statistic values of a plurality of pixels of a previous frame image acquired by the camera in the preset histogram statistic window; and determine the optimal motion vector according to the plurality of first histogram statistic values and the plurality of second histogram statistic values.

In some embodiments, the second determining unit is mainly configured to:

adjust the current frame image acquired by the camera, according to the motion vector corresponding to the output information;

determine at least one feature point in the adjusted frame image of the current frame image and at least one feature point in a previous frame image acquired by the camera; and determine the optimal motion vector from the at least one feature point in the adjusted frame image of the current frame image and the at least one feature point in the previous frame image acquired by the camera.

In another aspect, there is provided a focusing device. The device includes:

a processor; and memory for storing instructions executable by the processor, wherein the processor is configured to execute the steps of any of the methods according to the above first aspect.

In another aspect, there is provided a computer readable storage medium having stored thereon instructions that, when being executed by a processor, implement the steps of the method according to the above first aspect.

In another aspect, there is provided a computer program product including instructions; the computer program product, when running on a computer, enables the computer to execute the steps of the method according to the above first aspect.

In another aspect, a mobile terminal is provided including the device described above, and further including a microphone and a speaker.

In some embodiments, the mobile terminal is a mobile phone.

In some embodiments, the processor is a general-purpose processor, such as central processing unit (CPU) of the mobile phone, which is configured to not only realize the methods described above but also run programs or applications (Apps) on the mobile phone, such as browsing, gaming, video/textual/voice communications, etc.

In some other embodiments, the processor is an ASIC described above.

In some embodiments, the camera is integrated with the mobile phone; in some other embodiments, the camera can be a plug-and-play device for the mobile phone, and can access and be controlled by the programs/apps/instructions stored on the phone. In some implementations, the camera can draw power from the phone. In some other implementations, the camera can have its own battery.

In some embodiments, the camera includes one or more lenses, and a motor configured to adjust positions of the one or more lenses to achieve the focusing.

In some embodiments, the mobile phone further includes a micro-electro-mechanical systems (MEMS) motion sensor configured to sense a three-dimensional motion and/or attitude of the camera for the jittering compensation.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of the present disclosure, illustrate embodiments consistent with the disclosure and, together with the description, serve to explain the principles of the disclosure.

DETAILED DESCRIPTION

Reference will now be made in detail to some embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with the disclosure. Instead, they are merely examples of apparatuses and methods consistent with aspects related to the disclosure as recited in the appended claims.

The inventors of the present application have recognized that, digital zooming can be performed during photographing or videotaping; however, due to the characteristics of digital zooming, the pixels in the image captured by the camera will be reduced. Therefore, contrast focusing is usually used to achieve focusing. In the process of focusing, people often fail to focus due to the hand jittering. Therefore, in the related art, image jittering is usually removed by optical image stabilization. That is, a set of optic sheets that can move up/down and leftward/rightward are mounted in the lens of the mobile terminal. When the hand is jittering, a detection circuit in the mobile terminal can detect the direction of jittering, and then the control circuit in the mobile terminal can control the optical sheets to move according to the detected direction so as to compensate for the jittering and thus to stabilize the image.

When the focusing fails due to hand jittering of people, the focusing method according to some embodiments of the present disclosure can be used to remove the influence of the jittering during the focusing process, and the accuracy of focusing is improved.

For example, when the user takes a selfie through the mobile phone, the hand is jittering due to holding the mobile phone for a long time. In this situation, the above focusing method can be used to perform focusing, thereby removing the influence of jittering and improving the accuracy of focusing. Clear photos can be taken after a successful focusing.

In an example, when the user wants to enlarge the captured image because the distance is too far, digital zooming can be performed. The pixels in the image captured by the camera during the digital zooming process are reduced. The electronic anti-jittering (electronic image stabilization) is to analyze the captured image, and then use the edge information of the image to process the captured image so as to achieve jittering compensation.

Therefore, anti-jittering processing using electronic image stabilization will sacrifice a small portion of the edge image, typically 10%. However, since the pixels in the image captured by the camera during zooming are reduced, and the edge image of the photo is not required, the 10% image sacrificed by the electronic anti-jittering method does not substantially affect the image captured during digital zooming. Therefore, when photographing after digital zooming, in order to prevent focusing failure caused by hand jittering of people and unclear image caused thereby, the above focusing method can be used, thereby removing the influence of jittering and successfully achieving focusing and photographing/videotaping.

Some embodiments of the present disclosure may be applied to the above two application scenarios. In actual applications, various embodiments of the disclosure may be applied to other application scenarios, which are not listed exhaustively herein.

At present, people are increasingly using mobile terminals for photographing or videotaping. In order to improve the quality of image or video, focusing is required during photographing or videotaping. However, during the focusing process, focusing failure is often caused by hand jittering of people. In the related art, the statistic value calculation is usually directly performed on the image as acquired, and the focusing algorithm is used for focusing. The influence of the jittering on the focusing process is ignored, so the acquired image is not stable enough. As a result, the calculation of the statistic value is not accurate enough. This may cause focusing failure, making the captured image not clear enough. Alternatively, jittering is removed by optical image stabilization, but this method requires that a set of optic sheets that can move up/down and leftward/rightward be mounted in the lens of the mobile terminal, and the cost is high. Therefore, in order to solve the problems in the related art, the present disclosure proposes a focusing method, device, and a storage medium.

Figure 1:
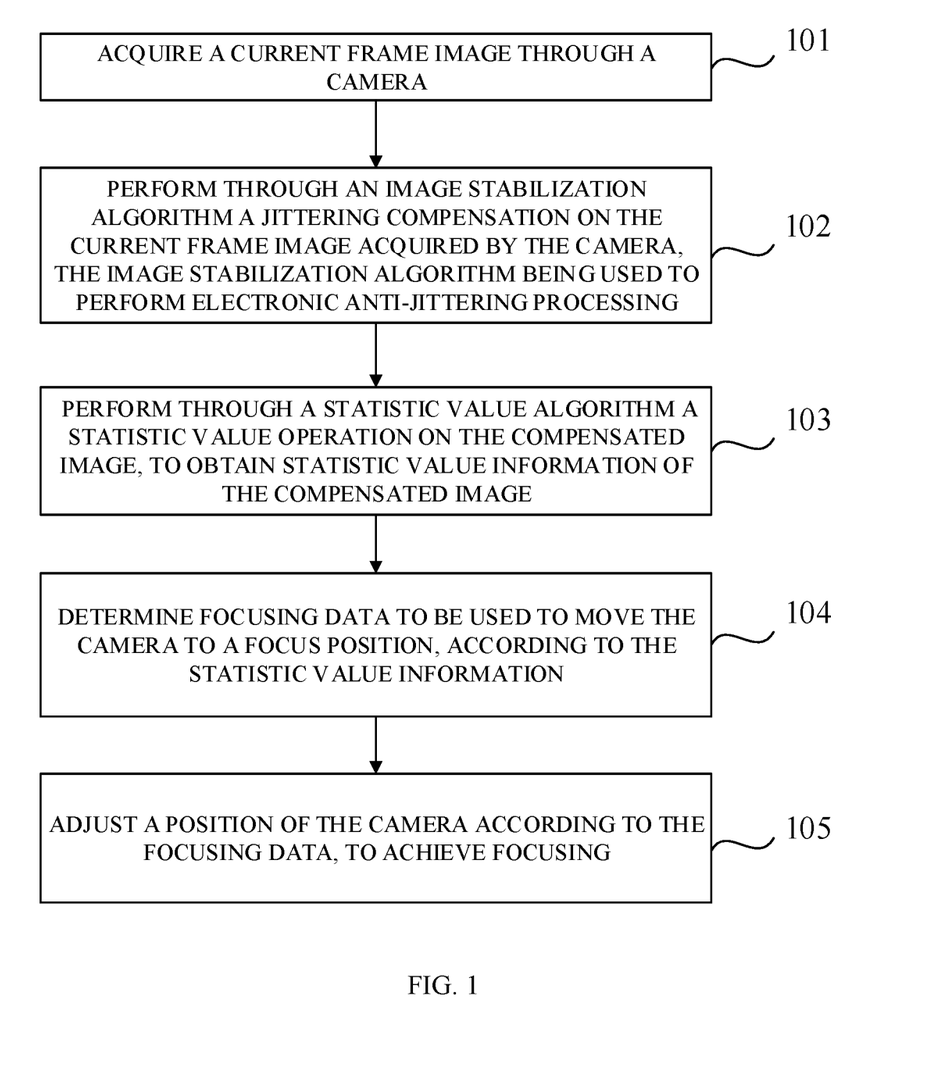
FIG. 1 is a flowchart illustrating a focusing method according to some embodiments.

FIG. 1 is a flowchart illustrating a focusing method according to some embodiments. The method is applied to terminals such as digital cameras, mobile terminals (e.g., mobile phones, tablet computer), or the like. As shown in FIG. 1, the method includes the following steps:

step 101: acquiring a current frame image through a camera;

step 102: performing through an image stabilization algorithm a jittering compensation on the current frame image acquired by the camera to form a compensated image, the image stabilization algorithm being used to perform electronic anti-jittering processing;

step 103: performing through a statistic value algorithm a statistic value operation on the compensated image, to obtain statistic value information of the compensated image;

step 104: determining focusing data to be used to move the camera to a focus position, according to the statistic value information; and step 105: adjusting a position of the camera according to the focusing data, to achieve focusing.

More specifically, by acquiring a current frame image through a camera, and by performing through an image stabilization algorithm a jittering compensation on the current frame image acquired by the camera, the influence of jittering on the current frame image acquired by the camera is removed; by performing through a statistic value algorithm a statistic value operation on the compensated image, statistic value information of the compensated image is obtained; according to the statistic value information, focusing data to be used to move the camera to a focus position is determined; a position of the camera is determined according to the focusing data, thus achieving focusing. The influence of jittering of the camera on the image is removed in the focusing process through the image stabilization algorithm, the stability of image is improved so that the statistic value operation is more accurate, the accuracy of focusing result is improved, and also the cost is reduced.

In some embodiments, said performing through an image stabilization algorithm a jittering compensation on the current frame image acquired by the camera to form a compensated image, includes:

determining an optimal motion vector for indicating a jittering direction of the camera and a jittering displacement amount of the camera in a three-dimensional space; and performing the jittering compensation on the current frame image acquired by the camera according to the optimal motion vector.

In some embodiments, said determining an optimal motion vector includes:

obtaining output information of a gyroscope, the output information including a jittering direction of the camera and a displacement amount of the camera in a three-dimensional space;

determining a motion vector corresponding to the output information; and determining the optimal motion vector according to the motion vector corresponding to the output information.

In some embodiments, said determining the optimal motion vector according to the motion vector corresponding to the output information includes:

adjusting the current frame image acquired by the camera, according to the motion vector corresponding to the output information;

obtaining a plurality of first histogram statistic values and a plurality of second histogram statistic values, wherein the plurality of first histogram statistic values refer to histogram statistic values of a plurality of pixels of the adjusted frame image of the current frame image in a preset histogram statistic window, and the second histogram statistic values refer to histogram statistic values of a plurality of pixels of a previous frame image acquired by the camera in the preset histogram statistic window; and determining the optimal motion vector according to the plurality of first histogram statistic values and the plurality of second histogram statistic values.

In some embodiments, said determining the optimal motion vector according to the motion vector corresponding to the output information includes:

adjusting the current frame image acquired by the camera, according to the motion vector corresponding to the output information;

determining at least one feature point in the adjusted frame image of the current frame image and at least one feature point in a previous frame image acquired by the camera; and determining the optimal motion vector from the at least one feature point in the adjusted frame image of the current frame image and the at least one feature point in the previous frame image acquired by the camera.

All the above optional technical solutions can be arbitrarily combined to form alternative embodiments of the present disclosure, which will not be exhaustively described herein.

Figure 2:
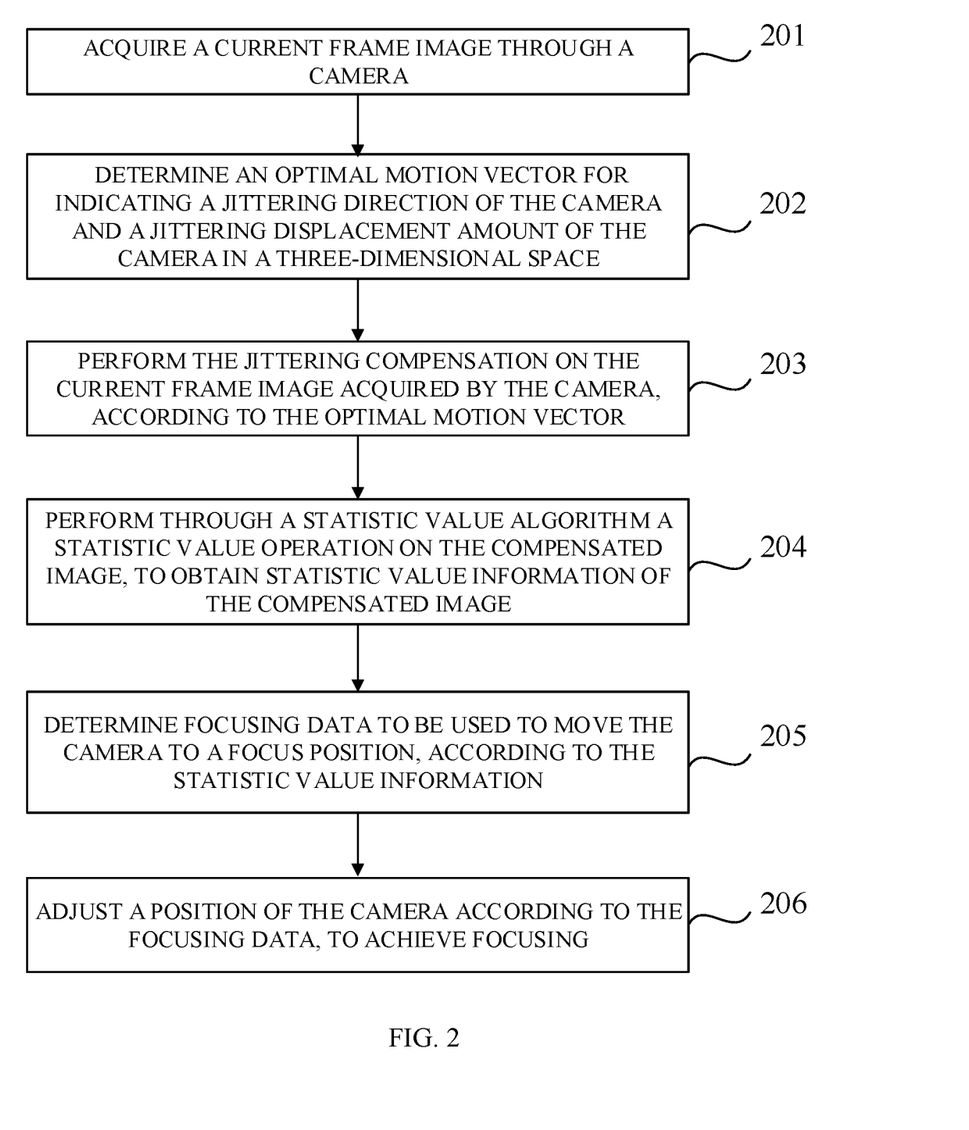
FIG. 2 is a flowchart illustrating another focusing method according to some embodiments.

FIG. 2 is a flowchart illustrating another focusing method according to some embodiments. The following embodiment will be elaborated on the basis of the embodiment illustrated in FIG. 1. The present method is applied to terminals such as digital cameras, mobile terminals (e.g., mobile phones, tablet computer), or the like. As shown in FIG. 2, the method includes the following steps.

Step 201: acquiring a current frame image through a camera.

According to some embodiments, acquiring the current frame image may refer to activating the camera for acquisition when a wake-up operation for the camera is detected. In actual implementation, the camera may be activated when a click operation on the camera is detected, and the current frame image may be acquired. Of course, it is also possible that when voice information sent by the user, which is a voice control instruction for activating the camera, is received, the camera is activated to acquire the current frame image, and the embodiments of the present disclosure have no limitation on this.

According to some embodiments of the present disclosure, an image sensor may be included in the camera and is used for converting the acquired optical image into an electrical signal. When the user activates the camera of the terminal, the image sensor in the camera will always be in an operational state, i.e., the camera always acquires images after being activated. Therefore, multiple frames of images will be acquired by the camera, and the current frame image refers to a frame of image acquired by the camera at the current time.

In some embodiments, after the current frame image is acquired by the camera, in order to remove the influence of the camera jittering on the image during the focusing process and to increase the stability of the image, the terminal may further perform through the image stabilization algorithm a jittering compensation on the current frame image acquired by the camera. The image stabilization algorithm is used to perform electronic anti-jittering processing. The actual implementation can be realized by the following steps 202-203.

Step 202: determining an optimal motion vector for indicating a jittering direction of the camera and a jittering displacement amount of the camera in a three-dimensional space.

In some embodiments, during the photographing or videotaping process, when the user's hand is jittering, the terminal held by the user may also be jittering, and accordingly, the camera will also be jittering. The change of the camera before and after jittering can be represented by a vector formed by the camera's jittering direction and the jittering displacement amount of the camera in a three-dimensional space.

In some embodiments, when determining the optimal motion vector, output information of a gyroscope can be obtained, the output information including a jittering direction of the camera and a displacement amount of the camera in a three-dimensional space; a motion vector corresponding to the output information is determined; and the optimal motion vector is determined according to the motion vector corresponding to the output information.

In some embodiments, the camera may include a gyroscope, which is an angular motion detecting device for detecting the jitter information of the camera, i.e., the jittering direction of the camera and the displacement amount of the camera in the three-dimensional space. The output information of the gyroscope is a set of data, and then the motion vector corresponding to the set of data can be determined. For example, the output information of the gyroscope may be coordinate values in the three-dimensional coordinates.

In some embodiments of the present disclosure, when the optimal motion vector is determined according to the motion vector corresponding to the output information, the motion vector corresponding to the output information may be directly determined as the optimal motion vector. However, in practical applications, since there is a slight error between the motion vector corresponding to the output information of the gyroscope and the actual jittering direction of the camera and the actual jittering displacement amount of the camera in the three-dimensional space, the optimal motion vector can be determined in the following two possible implementations on the basis of the motion vector corresponding to the output information of the gyroscope, so as to eliminate the error of the motion vector corresponding to the output information of the gyroscope. In this way, the determined optimal motion vector can represent the jittering direction of the camera and the displacement amount of the camera in three-dimensional space more accurately, making the jitter compensation be more accurately performed.

The first possible implementation: adjusting the current frame image acquired by the camera, according to the motion vector corresponding to the output information; obtaining a plurality of first histogram statistic values and a plurality of second histogram statistic values, wherein the plurality of first histogram statistic values refer to histogram statistic values of a plurality of pixels of the adjusted frame image of the current frame image in a preset histogram statistic window, and the second histogram statistic values refer to histogram statistic values of a plurality of pixels of a previous frame image acquired by the camera in the preset histogram statistic window; and determining the optimal motion vector according to the plurality of first histogram statistic values and the plurality of second histogram statistic values.

In some embodiments, when adjusting the current frame image acquired by the camera, according to the motion vector corresponding to the output information, the acquired current frame image may be moved by the displacement amount in the three-dimensional space indicated by the motion vector, according to a direction opposite to the direction indicated by the motion vector, so that an adjusted frame image of the current frame image can be obtained.

According to some embodiments, since the motion vector corresponding to the output information can basically determine the jittering direction of the camera and the displacement amount of the camera in the three-dimensional space, and there is only a slight difference from the actual jittering of the camera, the current frame image acquired by the camera can be adjusted firstly according to the motion vector corresponding to the output information, so as to determine an approximate jittering direction of the camera and the displacement amount of the camera in the three-dimensional space. Then, with only a minor adjustment, the optimal motion vector according to the plurality of first histogram statistic values and the plurality of second histogram statistic values can be determined, thus obtaining the optimal motion vector that is closer to the actual jittering of the camera. The optimal motion vector is determined according to the plurality of first histogram statistic values and the plurality of second histogram statistic values with no need for considerable adjustment, so that the optimal motion vector as determined can be closer to the actual jittering of the camera. Meanwhile, the operation is simplified and time is saved.

According to some embodiments, the histogram is a statistic table which reflects the pixel distribution of the image, wherein the horizontal coordinates of the histogram indicate the type of the image pixel, which may be a color value or a gray scale value, and the vertical coordinates indicate the total number of pixels of each color value or gray scale in the image or the percentage thereof in all the pixels.

In some embodiments, before obtaining the histogram statistic values, it is required to obtain the color value or gray scale value of each pixel in a preset histogram statistic window. For example, the color value of each pixel point may be determined in an RGB (Red-Green-Blue) color space according to the R sub-pixel, the G sub-pixel, and the B sub-pixel of the pixel. Alternatively, the image is converted from the RGB color space to the YUV color space, wherein "Y" represents brightness, i.e., gray scale value, and "U" and "V" represent chromaticity. The gray scale value of each pixel can be determined from the YUV color space. Then, statistics are performed on the color value or the gray scale value of each pixel to obtain a corresponding histogram, thereby obtaining histogram statistic values.

According to some embodiments, when obtaining the histogram statistic values of the plurality of pixels of the adjusted frame image of the current frame image in the preset histogram statistic window and the histogram statistic values of the plurality of pixels of the previous frame image acquired by the camera in the preset histogram statistic window, the preset histogram statistic window is fixed, and generally, the center position of the preset histogram statistic window corresponds to the center position before the current frame image is moved. When the adjusted frame image of the current frame image moves, the histogram statistic values of the plurality of pixels in the preset histogram statistic window will change.

In some embodiments, when determining the optimal motion vector according to the plurality of first histogram statistic values and the plurality of second histogram statistic values, it can be firstly determined whether the plurality of first histogram statistic values and the plurality of second histograms statistic values have the same histograms statistic value in the same position. If not, the adjusted frame image of the current frame image is moved, and then a plurality of the first histogram statistic values can be obtained again with the movement of the adjusted frame image of the current frame image. If the plurality of first histogram statistic values as obtained again and the plurality of second histograms statistic values have the same histograms statistic value in the same position, it can be determined that the current frame image after movement matches with the previous frame image. If the plurality of first histogram statistic values as obtained again and the plurality of second histogram statistic values have different histogram statistic values in the same position, the step of moving the current frame image is executed again until the plurality of first histogram statistic values as obtained again and the plurality of second histograms statistic values have the same histograms statistic values in the same position. Then, the moving direction of the adjusted frame image of the current frame image and the moving displacement amount thereof in the three-dimensional space can be determined, and the determined moving direction and the moving displacement amount form a vector, which is taken as the optimal motion vector.

According to some embodiments, by moving the adjusted frame image of the current frame image, the adjusted frame image of the current frame image matches with the previous frame image acquired by the camera. That is, when the plurality of first histogram statistic values and the plurality of second histogram statistic values have the same histogram statistic value in the same position, the vector formed by the moving direction of the adjusted frame image of the current frame image and the moving displacement amount thereof in the three-dimensional space is used as the optimal motion vector. By matching a plurality of first histogram statistic values and a plurality of second histogram statistic values, and on the basis of the motion vector corresponding to the output information of the gyroscope, the jittering direction of the camera and the displacement amount of the camera in the three-dimensional space can be more accurately determined. The problem that the determined optimal motion vector is inaccurate due to the possible error of the output information of the gyroscope is avoided.

According to some embodiments, when the current frame image is the first frame image acquired by the camera, the previous frame image acquired by the camera neither exists nor can be acquired. In this situation, the output information of the gyroscope can be directly obtained, and the motion vector corresponding to the output information is determined and used as the optimal motion vector for subsequent jittering compensation.

The second possible implementation: adjusting the current frame image acquired by the camera, according to the motion vector corresponding to the output information; determining at least one feature point in the adjusted frame image of the current frame image and at least one feature point in the previous frame image acquired by the camera; and determining the optimal motion vector from the at least one feature point in the adjusted frame image of the current frame image and the at least one feature point in the previous frame image acquired by the camera.

According to some embodiments, the feature point refers to a point that can reflect important information in the image, such as an edge, a contour, a straight line, a corner point, and the like in the image. At least one feature point in the adjusted frame image of the current frame image and at least one feature point in the previous frame image acquired by the camera are the same feature point.

According to some embodiments of the present disclosure, before the feature point is extracted, the adjusted current frame image and the previous frame image acquired by the camera may be pre-processed to enhance the overall contrast of the image, to remove the noise of the image, and to enhance gray scale contrast so that the edge lines become clear. Then, it is possible to locate and measure the positional changes of the notable features in the image, such as the eyes, eyebrows and mouth in the face, so as to determine the size, distance, shape, and mutual proportion of these features, thereby extracting feature points in the adjusted current frame image and the previous frame image acquired by the camera. Of course, PCA (Principal Components Analysis) and ICA (Independent Component Analysis) methods can also be used to extract feature points in the adjusted current frame image and the previous frame image acquired by the camera. Alternatively, the image is transformed from the spatial domain to the frequency domain by Gabor wavelet transform, and then the frequency domain features in the image are extracted. In the actual applications, the feature extraction may be performed in other manners, for example, the motion features of the dynamic image sequence are extracted by the optical flow method or the like, and the embodiments of the present disclosure have no limitations on this.

In a possible implementation manner, when the optimal motion vector is determined from the at least one feature point in the adjusted frame image of the current frame image and the at least one feature point in the previous frame image acquired by the camera, it can be firstly determined whether the position of at least one feature point in the adjusted frame image of the current frame image coincides with the position of at least one feature point in the previous frame image acquired by the camera. If not, the adjusted frame image of the current frame image is moved. After the movement, if it is determined that the position of at least one feature point in the adjusted frame image of the current frame image coincides with the position of at least one feature point in the previous frame image acquired by the camera, the moving direction of the adjusted frame image of the current frame image and the moving displacement amount thereof in the three-dimensional space are determined, and the determined moving direction and the moving displacement amount form a vector, which is taken as the optimal motion vector.

According to some embodiments, by moving the adjusted frame image of the current frame image, the position of at least one feature point in the adjusted frame image of the current frame image coincides with the position of at least one feature point in the previous frame image acquired by the camera, so that on the basis of the motion vector corresponding to the output information of the gyroscope, the jittering direction of the camera and the displacement amount of the camera in the three-dimensional space can be more accurately determined. The problem that the determined optimal motion vector is inaccurate due to the possible error of the output information of the gyroscope is avoided.

In some other embodiments, when the optimal motion vector is determined from the at least one feature point in the adjusted frame image of the current frame image and the at least one feature point in the previous frame image acquired by the camera, the coordinates of the at least one feature point in the adjusted frame image of the current frame image and the coordinates of the at least one feature point in the previous frame image acquired by the camera can be obtained directly. When it is determined, according to the coordinates of the at least one feature point in the adjusted frame image of the current frame image and the coordinates of the at least one feature point in the previous frame image acquired by the camera, that the position of at least one feature point in the adjusted frame image of the current frame image coincides with the position of at least one feature point in the previous frame image acquired by the camera, the required moving direction of the adjusted frame image of the current frame image and the required moving displacement amount thereof in the three-dimensional space are determined, and the determined moving direction and the moving displacement amount form a vector, which is taken as the optimal motion vector.

According to some embodiments, for the method of determining the moving direction and the moving displacement amount according to the coordinates, reference can be made to related technologies. In some embodiments, the optimal motion vector is calculated through the coordinates of identical feature points in two images, so that on the basis of the motion vector corresponding to the output information of the gyroscope, the jittering direction of the camera and the displacement amount of the camera in the three-dimensional space can be more accurately determined. The problem that the determined optimal motion vector is inaccurate due to the possible error of the output information of the gyroscope is avoided.

According to some embodiments, when the current frame image is the first frame image acquired by the camera, the previous frame image acquired by the camera neither exists nor can be acquired. In this situation, the output information of the gyroscope can be directly obtained, and the motion vector corresponding to the output information is determined and used as the optimal motion vector for subsequent jittering compensation.

According to some embodiments of the present disclosure, there may be cases where feature points cannot be extracted from the current frame image acquired by the camera and the previous frame image acquired by the camera. For example, the current frame image as acquired is a piece of white paper, and there are no feature points that can be extracted from the image. In this embodiment, the output information of the gyroscope can be obtained directly, the motion vector corresponding to the output information is determined, and the motion vector is used as the optimal motion vector for jittering compensation.

Step 203: performing the jittering compensation on the current frame image acquired by the camera, according to the optimal motion vector.

In some embodiments, when performing the jittering compensation on the current frame image acquired by the camera according to the optimal motion vector, the current frame image acquired by the camera may be moved in a direction opposite to the jittering direction indicated by the optimal motion vector, and the displacement amount of the movement is jittering displacement amount indicated by the optimal motion vector. The image obtained after the movement is the compensated image.

In some embodiments, after the optimal motion vector is determined, the current frame image acquired by the camera is moved by the jittering displacement amount indicated by the optimal motion vector in a direction opposite to the jittering direction indicated by the optimal motion vector. This process is a process in which the image stabilization algorithm performs electronic anti-jittering. Then, the compensated image is obtained.

In addition, in some embodiments of the present disclosure, an optimal motion vector capable of accurately indicating the jittering direction of the camera and the displacement amount of the camera in the three-dimensional space is determined, and then the current frame image acquired by the camera is adjusted according to the optimal motion vector. The influence of camera jittering on image stability is removed, thus realizing jittering compensation, improving image stability, and laying a foundation for subsequent successful focusing.

Step 204: performing through a statistic value algorithm a statistic value operation on the compensated image, to obtain statistic value information of the compensated image.

The statistic value information may be the gray scale value of the compensated image or the brightness value of the compensated image. In some embodiments, the statistic value information may also be other information, such as the acutance of the compensated image.

In some embodiments, the statistic value information is data information for evaluating the image sharpness through a preset focusing algorithm. Therefore, when the preset focusing algorithms are different, the statistic value information is also different. Therefore, when the statistic value operation is performed on the compensated image by the statistic value algorithm, the sharpness evaluation method selected in the preset focusing algorithm needs to be determined, and then the statistic value information corresponding to the method is obtained.

For example, when the preset focusing algorithm evaluates the sharpness of the image by the spatial gradient function evaluation method, the statistic value information required for the spatial gradient function evaluation method is brightness information or gray scale information. Thus, when the statistic value operation is performed on the compensated image, it is necessary to obtain the gray scale value or the brightness value of each pixel in the compensated image, and then perform statistics on the gray scale value or the brightness value of each pixel in the compensated image to obtain statistic value information of the compensated image.

For example, when the preset focusing algorithm evaluates the sharpness of the image by the frequency domain operator method, the statistic value information required by the frequency domain operator method is the frequency domain information. Thus, when the statistic value operation is performed on the compensated image, it is firstly necessary to transform the compensated image into the frequency domain, and to obtain the frequency domain information of the compensated image such as the low frequency, the intermediate frequency and the high frequency. The statistic value information of the compensated image is statistically obtained.

In some applications, since the acquisition of the statistic value information is associated with the method of evaluating the sharpness of the image, different methods of evaluating the sharpness of the image correspond to different statistic value information, and the above two methods are merely exemplary methods provided by the present disclosure. In actual applications, the evaluation can be implemented through other methods, and the embodiments of the present disclosure have no limitations on this.

Step 205: determining focusing data to be used to move the camera to a focus position, according to the statistic value information.

The focusing data is used to indicate the required moving direction of the camera and the displacement amount of the camera in the three-dimensional space. When determining focusing data to be used to move the camera to a focus position according to the statistic value information, the sharpness of the acquired image is the highest when the camera is accurately focused. Therefore, in actual implementations, the compensated image may be evaluated according to a preset auto-focusing algorithm. For example, through a spatial gradient function evaluation method, a frequency domain operator method, or an information entropy function method, the sharpness of the compensated image can be evaluated according to the statistic information of the compensated image. That is, the sharpness of the compensated image is determined. Then, the sharpness of the center area of the compensated image is compared with the sharpness of the center area of multiple frames of image acquired by the camera before the current moment so as to determine the image with the highest sharpness in the center area, wherein the center area is the area where the focus position is located. Since the image acquired at the focus position has the highest sharpness, the image with the highest sharpness in the central area can be determined as the image acquired at the focus position, the position where the camera is located when the image with the highest sharpness is acquired is determined as the focus position, and the data corresponding to the focus position is used as focusing data, thereby obtaining focusing data for moving the camera to the focus position.

The evaluation of the sharpness of the image by the spatial gradient function evaluation method, the frequency domain operator method or the information entropy function method is well known in the art, and will be not described in detail in the embodiments of the present disclosure.

Step 206: adjusting a position of the camera according to the focusing data, to achieve focusing.

The terminal includes a motor for controlling the movement of the camera. When the position of the camera is adjusted according to the focusing data, the motor can be driven to control the camera to move according to the direction and displacement amount indicated by the focusing data, so that the camera reaches the focus position. At this time, the image acquired by the camera has the highest sharpness, thus realizing accurate focusing.

Further, after the focusing is achieved in step 206, when a photographing/videotaping instruction is received, a photographing/videotaping operation can be performed by the camera.

The photographing/videotaping may be performed when a click operation on the shutter is detected. Of course, it is possible that when voice information sent by the user, which is a voice control instruction for instructing the camera to perform photographing/videotaping, is received, the camera performs the photographing/videotaping. The embodiments of the disclosure have no limitations on this.

According to some embodiments of the present disclosure, a current frame image is acquired by a camera, the optimal motion vector for indicating a jittering direction of the camera and a jittering displacement amount of the camera in a three-dimensional space is determined, and a jittering compensation is performed on the current frame image acquired by the camera according to the optimal motion vector, thus removing the influence of jittering on the current frame image acquired by the camera and improving the stability of image. Then, by performing a statistic value operation on the compensated image through a statistic value algorithm, statistic value information of the compensated image is obtained; according to the statistic value information, focusing data to be used to move the camera to a focus position is determined; the position of the camera is determined according to the focusing data, thus achieving focusing. The influence of jittering of the camera on the image is removed in the focusing process through the image stabilization algorithm, the stability of image is improved so that the statistic value operation is more accurate, the accuracy of focusing result is improved, and also the cost is reduced.

Figure 3:
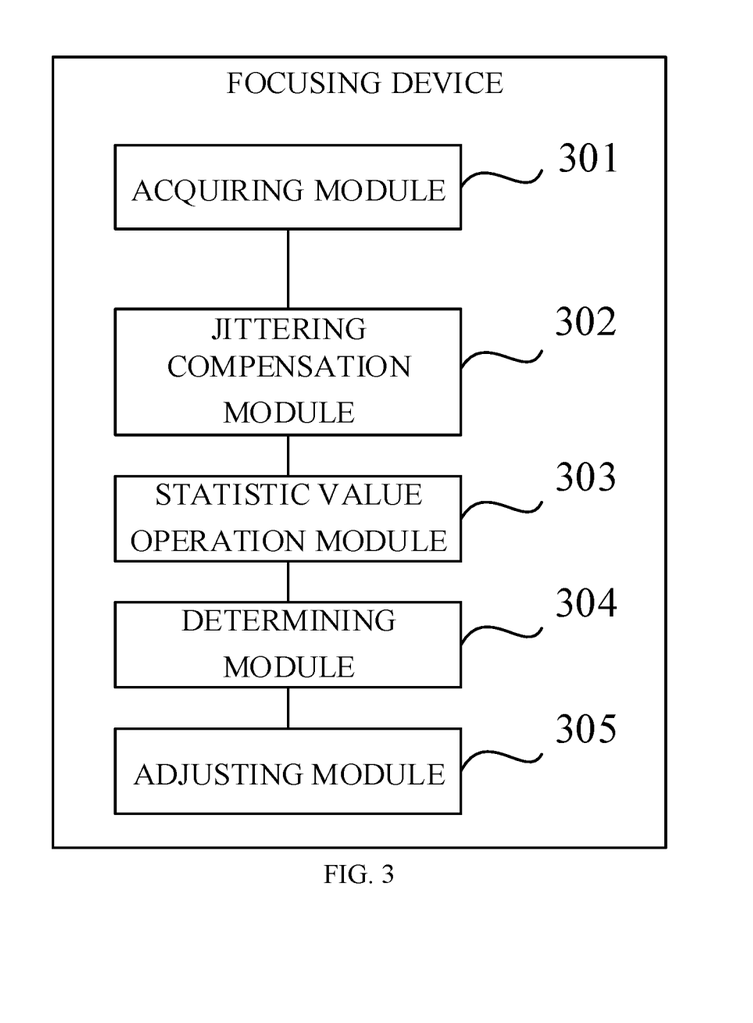
FIG. 3 is a schematic structural diagram illustrating a focusing device according to some embodiments.

FIG. 3 is a schematic structural diagram illustrating a focusing device according to some embodiments. With reference to FIG. 3, the device includes an acquiring module 301, a jittering compensation module 302, a statistic value operation module 303, a determining module 304, and an adjusting module 305, the acquiring module 301 is configured to acquire a current frame image through a camera;

the jittering compensation module 302 is configured to perform through an image stabilization algorithm a jittering compensation on the current frame image acquired by the camera, the image stabilization algorithm being used to perform electronic anti-jittering processing;

the statistic value operation module 303 is configured to perform through a statistic value algorithm a statistic value operation on the compensated image, to obtain statistic value information of the compensated image;

the determining module 304 is configured to determine focusing data to be used to move the camera to a focus position, according to the statistic value information; and the adjusting module 305 is configured to adjust a position of the camera according to the focusing data to achieve focusing.

It is noted that the various device components, units, blocks, or portions may have modular configurations, or are composed of discrete components, but nonetheless may be referred to as "modules" in general. In other words, the "modules" or "units" referred to herein may or may not be in modular forms.

In some embodiments, the jittering compensation module 302 includes:

a first determining sub-module, configured to determine an optimal motion vector for indicating a jittering direction of the camera and a jittering displacement amount of the camera in a three-dimensional space; and a jittering compensation sub-module, configured to perform the jittering compensation on the current frame image acquired by the camera, according to the optimal motion vector.

In some embodiments, the first determining sub-module includes:

an obtaining unit, configured to obtain output information of a gyroscope, the output information including a jittering direction of the camera and a displacement amount of the camera in a three-dimensional space;

a first determining unit, configured to determine a motion vector corresponding to the output information; and a second determining unit, configured to determine the optimal motion vector according to the motion vector corresponding to the output information.

In some embodiments, the second determining unit is mainly configured to:

adjust the current frame image acquired by the camera, according to the motion vector corresponding to the output information;

obtain a plurality of first histogram statistic values and a plurality of second histogram statistic values, wherein the plurality of first histogram statistic values refer to histogram statistic values of a plurality of pixels of the adjusted frame image of the current frame image in a preset histogram statistics window, and the second histogram statistic values refer to histogram statistic values of a plurality of pixels of a previous frame image acquired by the camera in the preset histogram statistics window; and determine the optimal motion vector according to the plurality of first histogram statistic values and the plurality of second histogram statistic values In some embodiments, the second determining unit is mainly configured to:

adjust the current frame image acquired by the camera, according to the motion vector corresponding to the output information;

determine at least one feature point in the adjusted frame image of the current frame image and at least one feature point in a previous frame image acquired by the camera; and determine the optimal motion vector from the at least one feature point in the adjusted frame image of the current frame image and the at least one feature point in the previous frame image acquired by the camera.

According to some embodiments of the present disclosure, by acquiring a current frame image through a camera, and by performing through an image stabilization algorithm a jittering compensation on the current frame image acquired by the camera, the influence of jittering on the current frame image acquired by the camera is removed; by performing through a statistic value algorithm a statistic value operation on the compensated image, statistic value information of the compensated image is obtained; according to the statistic value information, focusing data to be used to move the camera to a focus position is determined; the position of the camera is determined according to the focusing data, thus achieving focusing. The influence of jittering of the camera on the image is removed in the focusing process through the image stabilization algorithm, the stability of image is improved so that the statistic value operation is more accurate, the accuracy of focusing result is improved, and also the cost is reduced.

For the device in the above embodiment, the specific manners in which various modules thereof operate have been described in detail in the embodiment relating to the above method, and therefore will not be repeated herein.

Figure 4:
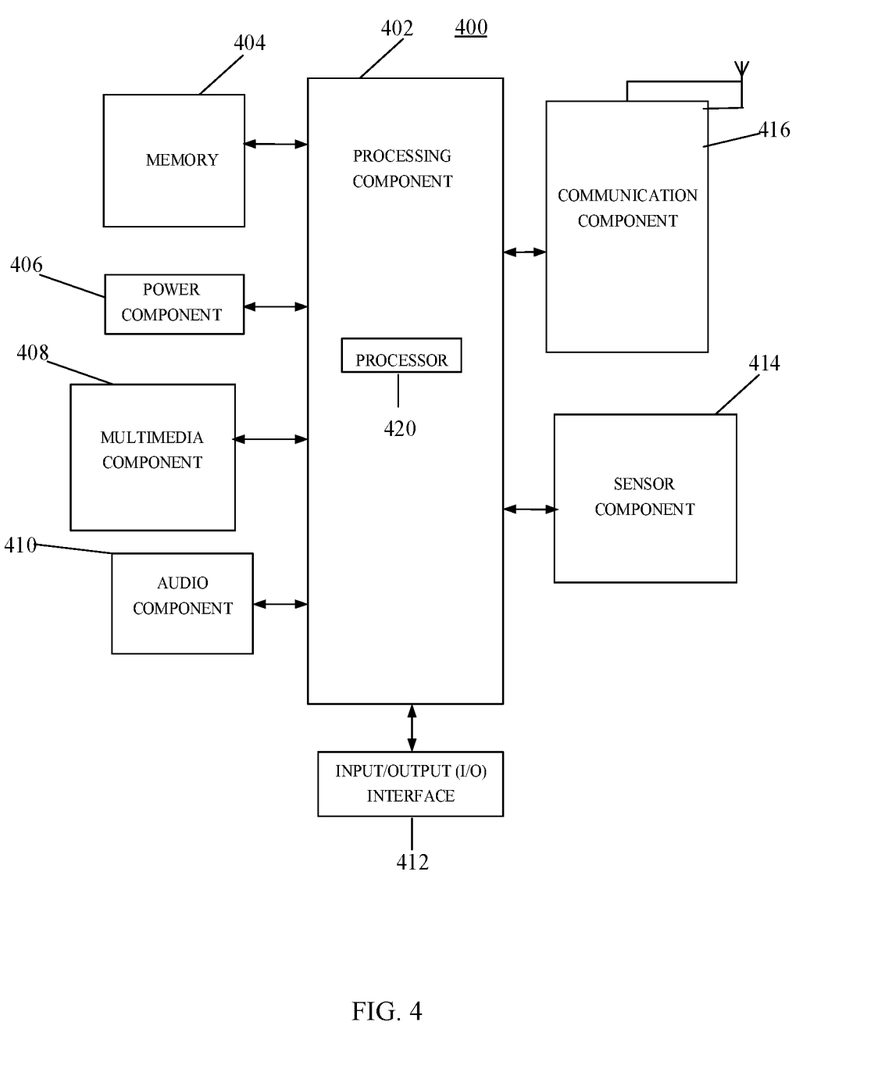
FIG. 4 is a schematic structural diagram illustrating another focusing device according to some embodiments.

FIG. 4 is a schematic structural diagram illustrating another focusing device according to some embodiments, wherein a device 400 for establishing a short-range wireless communication connection is illustrated. The device can be a smart TV, a TV box, a high-definition player, a monitor display device, a mobile phone, a computer, a digital broadcast terminal, a messaging device, a game console, a tablet device, a medical device, a fitness device, a personal digital assistant, and the like.

Referring to FIG. 4, the device 400 may include one or more of the following components: a processing component 402, a memory component 404, a power component 406, a multimedia component 408, an audio component 410, an input/output (I/O) interface 412, a sensor component 414, and a communication component 416.

The processing component 402 typically controls overall operations of the device 400, such as the operations associated with display, telephone calls, data communications, camera operations, and recording operations. The processing component 402 may include one or more processors 420 to execute instructions to perform all or part of the steps in the above described methods. Moreover, the processing component 402 may include one or more modules which facilitate the interaction between the processing component 402 and other components. For instance, the processing component 402 may include a multimedia module to facilitate the interaction between the multimedia component 408 and the processing component 402.

The memory 404 is configured to store various types of data to support the operation of the device 400. Examples of such data include instructions for any applications or methods operated on the device 400, contact data, phonebook data, messages, pictures, video, etc. The memory 404 may be implemented using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 provides power to various components of the device 400. The power component 406 may include a power management system, one or more power sources, and any other components associated with the generation, management, and distribution of power in the device 400.

The multimedia component 408 includes a screen providing an output interface between the device 400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 408 includes a front camera and/or a rear camera. The front camera and the rear camera may receive an external multimedia datum while the device 400 is in an operation mode, such as a photographing mode or a video mode. Each of the front camera and the rear camera may be a fixed optical lens system or have focus and optical zoom capability.

The audio component 410 is configured to output and/or input audio signals. For example, the audio component 410 includes a microphone ("MIC") configured to receive an external audio signal when the device 400 is in an operation mode, such as a call mode, a recording mode, and a voice recognition mode. The received audio signal may be further stored in the memory 404 or transmitted via the communication component 416. In some embodiments, the audio component 410 further includes a speaker to output audio signals.

The I/O interface 412 provides an interface between the processing component 402 and peripheral interface modules, such as a keyboard, a click wheel, buttons, and the like. The buttons may include, but are not limited to, a home button, a volume button, a starting button, and a locking button.

The sensor component 414 includes one or more sensors to provide status assessments of various aspects of the device 400. For instance, the sensor component 414 may detect an open/closed status of the device 400, relative positioning of components, e.g., the display and the keypad, of the device 400, a change in position of the device 400 or a component of the device 400, a presence or absence of user contact with the device 400, an orientation or an acceleration/deceleration of the device 400, and a change in temperature of the device 400. The sensor component 414 may include a proximity sensor configured to detect the presence of nearby objects without any physical contact. The sensor component 414 may also include a light sensor, such as a CMOS or CCD image sensor, for use in imaging applications. In some embodiments, the sensor component 414 may also include an accelerometer sensor, a gyroscope sensor, a magnetic sensor, a pressure sensor, or a temperature sensor.

In some embodiments, the sensor component 414 can comprises one or more micro-electro-mechanical systems (MEMS) configured to realize a three-dimensional motional and/or attitude detection.

The communication component 416 is configured to facilitate communication, wired or wirelessly, between the device 400 and other devices. The device 400 can access a wireless network based on a communication standard, such as WiFi, 2G, or 3G, or a combination thereof. In one exemplary embodiment, the communication component 416 receives a broadcast signal or broadcast associated information from an external broadcast management system via a broadcast channel. In one exemplary embodiment, the communication component 416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the method provided by the embodiments shown above in FIGS. 1 and 2.

In some embodiments, there is also provided a non-transitory computer-readable storage medium including instructions, such as included in the memory 404, executable by the processor 420 in the device 400, for performing the above described method. For example, the non-transitory computer-readable storage medium may be a ROM, a RAM, a CD-ROM, a magnetic tape, a floppy disc, an optical data storage device, and the like.

In some embodiments, there is also provided a non-transitory computer-readable storage medium; when the instructions stored therein are executed by the processor of the device, the device can perform the focusing methods illustrated above in FIGS. 1 and 2.

In some embodiments, there is also provided a computer program product including instructions; when the instructions stored therein are executed by the processor of the device, the device can perform the focusing methods illustrated above in FIGS. 1 and 2.

In another aspect, a mobile terminal is provided including the device described above, and further including a microphone and a speaker.

In some embodiments, the mobile terminal is a mobile phone.

In some embodiments, the processor is a general-purpose processor, such as central processing unit (CPU) of the mobile phone, which is configured to not only realize the methods described above but also run programs or applications (Apps) on the mobile phone, such as browsing, gaming, video/textual/voice communications, etc.

In some other embodiments, the processor is an ASIC described above.

In some embodiments, the camera is integrated with the mobile phone; in some other embodiments, the camera can be a plug-and-play device for the mobile phone, and can access and be controlled by the programs/apps/instructions stored on the phone. In some implementations, the camera can draw power from the phone. In some other implementations, the camera can have its own battery.

In some embodiments, the camera includes one or more lenses, and a motor configured to adjust positions of the one or more lenses to achieve the focusing.

In some embodiments, the mobile phone further includes a micro-electro-mechanical systems (MEMS) motion sensor configured to sense a three-dimensional motion and/or attitude of the camera for the jittering compensation.

At least some of the embodiments of the present disclosure can have one or more of the following advantages: by acquiring a current frame image through a camera, and by performing through an image stabilization algorithm a jittering compensation on the current frame image acquired by the camera, the influence of jittering on the current frame image acquired by the camera is removed; by performing through a statistic value algorithm a statistic value operation on the compensated image, statistic value information of the compensated image is obtained; according to the statistic value information, focusing data to be used to move the camera to a focus position is determined; a position of the camera is determined according to the focusing data, thus achieving focusing. The influence of uttering of the camera on the image is removed in the focusing process through the image stabilization algorithm, the stability of image is improved so that the statistic value operation is more accurate, the accuracy of focusing result is improved, and also the cost is reduced.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the focusing device, to perform a jittering compensation or other desired operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The features disclosed herein may be implemented as part of a smart home or a smart office design, which may implement individually or integrally various electronic devices in a home or office. For example, control or display functions described above may be realized on a smart television (or connected television, hybrid television, etc.), which may include a processing circuit configured to integrate Internet connectivity with more traditional television programming sources (e.g., received via cable, satellite, over-the-air, or other signals). The smart television may be physically incorporated into a television set or may include a separate device such as a set-top box, Blu-ray or other digital media player, game console, hotel television system, and other companion devices. A smart television may be configured to allow viewers to search and find videos, movies, photos and other content on the web, on a local cable TV channel, on a satellite TV channel, or stored on a local hard drive.

In some embodiments, a touch screen (not shown) is included on the focusing device allowing user input to control the focusing device directly.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A focusing method, comprising:
acquiring a current frame image through a camera;
performing through an image stabilization algorithm a jittering compensation on the current frame image acquired by the camera to form a compensated image, wherein the image stabilization algorithm is used to perform electronic anti-jittering processing;
performing through a statistic value algorithm a statistic value operation on the compensated image, to obtain statistic value information of the compensated image;
determining focusing data to be used to move the camera to a focus position, according to the statistic value information; and
adjusting a position of the camera according to the focusing data, to achieve focusing;
wherein said performing through an image stabilization algorithm a jittering compensation on the current frame image acquired by the camera to form a compensated image, further comprises:
determining an optimal motion vector for indicating a jittering direction of the camera and a jittering displacement amount of the camera in a three-dimensional space; and
performing the jittering compensation on the current frame image acquired by the camera, according to the optimal motion vector; and
wherein said determining an optimal motion vector further comprises:
obtaining output information of a gyroscope, wherein the output information comprises the jittering direction of the camera and the displacement amount of the camera in a three-dimensional space;
determining a motion vector corresponding to the output information; and
determining the optimal motion vector according to the motion vector corresponding to the output information.

2. The method according to claim 1, wherein said determining the optimal motion vector according to the motion vector corresponding to the output information further comprises:
adjusting the current frame image acquired by the camera, according to the motion vector corresponding to the output information;
obtaining a plurality of first histogram statistic values and a plurality of second histogram statistic values, wherein the plurality of first histogram statistic values refer to histogram statistic values of a plurality of pixels of the adjusted frame image of the current frame image in a preset histogram statistic window, and the plurality of second histogram statistic values refer to histogram statistic values of a plurality of pixels of a previous frame image acquired by the camera in the preset histogram statistic window; and
determining the optimal motion vector according to the plurality of first histogram statistic values and the plurality of second histogram statistic values.

3. The method according to claim 1, wherein said determining the optimal motion vector according to the motion vector corresponding to the output information further comprises:
adjusting the current frame image acquired by the camera, according to the motion vector corresponding to the output information;
determining at least one feature point in the adjusted frame image of the current frame image and at least one feature point in a previous frame image acquired by the camera; and
determining the optimal motion vector from the at least one feature point in the adjusted frame image of the current frame image and the at least one feature point in the previous frame image acquired by the camera.

4. A focusing device, comprising:
a processor; and
memory for storing instructions executable by the processor,
wherein the processor is configured execute the instructions to:
acquire a current frame image through a camera;
perform through an image stabilization algorithm a jittering compensation on the current frame image acquired by the camera to form a compensated image, wherein the image stabilization algorithm is used to perform electronic anti-jittering processing;
perform through a statistic value algorithm a statistic value operation on the compensated image, to obtain statistic value information of the compensated image;
determine focusing data to be used to move the camera to a focus position, according to the statistic value information; and
adjust a position of the camera according to the focusing data, to achieve focusing;
wherein the processor, configured to perform through an image stabilization algorithm a jittering compensation on the current frame image acquired by the camera to form a compensated image, is further configured to:
determine an optimal motion vector for indicating a jittering direction of the camera and a jittering displacement amount of the camera in a three-dimensional space; and perform the jittering compensation on the current frame image acquired by the camera, according to the optimal motion vector; and wherein the processor, configured to determine the optimal motion vector, is further configured to:

obtain output information of a gyroscope, wherein the output information comprises a jittering direction of the camera and a displacement amount of the camera in a three-dimensional space;

determine a motion vector corresponding to the output information; and determine the optimal motion vector according to the motion vector corresponding to the output information.

5. The device according to claim 4, wherein the processor, configured to determine the optimal motion vector according to the motion vector corresponding to the output information, is further configured to:

adjust the current frame image acquired by the camera, according to the motion vector corresponding to the output information;

obtain a plurality of first histogram statistic values and a plurality of second histogram statistic values, wherein the plurality of first histogram statistic values refer to histogram statistic values of a plurality of pixels of the adjusted frame image of the current frame image in a preset histogram statistic window, and the plurality of second histogram statistic values refer to histogram statistic values of a plurality of pixels of a previous frame image acquired by the camera in the preset histogram statistic window; and determine the optimal motion vector according to the plurality of first histogram statistic values and the plurality of second histogram statistic values.

6. The device according to claim 4, wherein the processor, configured to determine the optimal motion vector according to the motion vector corresponding to the output information, is further configured to:

determine at least one feature point in an adjusted frame image of the current frame image and at least one feature point in a previous frame image acquired by the camera; and determine the optimal motion vector from the at least one feature point in the adjusted frame image of the current frame image and the at least one feature point in the previous frame image acquired by the camera.

7. A mobile terminal comprising the device according to claim 4, further comprising a microphone and a speaker.

8. The mobile terminal according to claim 7, wherein the mobile terminal is a mobile phone, and the processor is a central processing unit (CPU) of the mobile phone.

9. The mobile terminal of claim 8, wherein the mobile phone comprises the camera.

10. The mobile terminal of claim 9, wherein the camera comprises one or more lenses, and a motor configured to adjust positions of the one or more lenses to achieve the focusing.

11. The mobile terminal of claim 10, further comprising a micro-electro-mechanical systems motion sensor configured to sense a three-dimensional motion and/or attitude of the camera for the jittering compensation.

12. A non-transitory computer readable storage medium having stored thereon instructions that, when being executed by a processor, cause the processor to:

acquire a current frame image through a camera;

perform through an image stabilization algorithm a jittering compensation on the current frame image acquired by the camera to form a compensated image, wherein the image stabilization algorithm is used to perform electronic anti-jittering processing;

perform through a statistic value algorithm a statistic value operation on the compensated image, to obtain statistic value information of the compensated image;

determine focusing data to be used to move the camera to a focus position, according to the statistic value information; and adjust a position of the camera according to the focusing data, to achieve focusing;

wherein the processor, configured to perform through an image stabilization algorithm a jittering compensation on the current frame image acquired by the camera to form a compensated image, is further configured to:

determine an optimal motion vector for indicating a jittering direction of the camera and a jittering displacement amount of the camera in a three-dimensional space; and perform the jittering compensation on the current frame image acquired by the camera, according to the optimal motion vector; and wherein the processor, configured to determine the optimal motion vector, is further configured to:

obtain output information of a gyroscope, wherein the output information comprises a jittering direction of the camera and a displacement amount of the camera in a three-dimensional space;

determine a motion vector corresponding to the output information; and determine the optimal motion vector according to the motion vector corresponding to the output information.

13. The storage medium according to claim 12, wherein the processor, configured to determine the optimal motion vector according to the motion vector corresponding to the output information, is further configured to:

adjust the current frame image acquired by the camera, according to the motion vector corresponding to the output information;

obtain a plurality of first histogram statistic values and a plurality of second histogram statistic values, wherein the plurality of first histogram statistic values refer to histogram statistic values of a plurality of pixels of the adjusted frame image of the current frame image in a preset histogram statistic window, and the plurality of second histogram statistic values refer to histogram statistic values of a plurality of pixels of a previous frame image acquired by the camera in the preset histogram statistic window; and determine the optimal motion vector according to the plurality of first histogram statistic values and the plurality of second histogram statistic values.

14. The storage medium according to claim 12, wherein the processor, configured to determine the optimal motion vector according to the motion vector corresponding to the output information, is further configured to:

determine at least one feature point in an adjusted frame image of the current frame image and at least one feature point in a previous frame image acquired by the camera; and determine the optimal motion vector from the at least one feature point in the adjusted frame image of the current frame image and the at least one feature point in the previous frame image acquired by the camera.

* * * * *